March 26, 1968     F. R. CATUARA ET AL     3,374,626
CONSTANT TORQUE CENTERING DEVICE FOR HYDROSTATIC
TRANSMISSION CONTROL Filed July 5, 1966     3 Sheets-Sheet 1

Inventors:
Frank R. Catuara
Donald W. Moyer
Pierce F. Richardson
By Walter G. Greavy
Atty.

Inventors:
Frank R. Catuara
Donald W. Moyer
Pierce F. Richardson
By Walter L. Greavy
Atty.

March 26, 1968

F. R. CATUARA ET AL 3,374,626

CONSTANT TORQUE CENTERING DEVICE FOR HYDROSTATIC
TRANSMISSION CONTROL

Filed July 5, 1966

Inventors:
Frank R. Catuara
Donald W. Moyer
Pierce F. Richardson
By Walter L. Greavy Atty.

United States Patent Office 3,374,626
Patented Mar. 26, 1968

3,374,626
CONSTANT TORQUE CENTERING DEVICE FOR HYDROSTATIC TRANSMISSION CONTROL
Frank R. Catuara, Chicago Ridge, Donald W. Moyer, Downers Grove, and Pierce F. Richardson, Hinsdale, Ill., assignors to International Harvester Company, Chicago, Ill., a corporation of Delaware
Filed July 5, 1966, Ser. No. 562,611
10 Claims. (Cl. 60—53)

This invention relates to control centering devices, but more specifically it is directed to a mechanism for returning the controls of a hydrostatic transmission to a neutral position when the control torque or force applied to an actuating member is removed therefrom.

It is well-known that difficulty has heretofore been experienced in moving a hydrostatic transmission toward and away from a neutral position, and in maintaining the transmission in a neutral position until a subsequent application of force or torque to an actuating member therefor. Such difficulty arises because of manufacturing tolerances of the elements thereof as well as from inherent characteristics relating to the reaction forces of such transmission and, so far as is known, no simplified and wholly reliable mechanism is available for circumventing such difficulty and satisfactorily accomplishing such operations.

It is a primary object of the present invention therefore to provide an improved, simple and novel mechanism for centering into a neutral position the swash plate servo controls of a hydrostatic transmission.

Another object is to provide a mechanism whereby a substantially constant actuating force may be applied to the controls of hydraulic servo devices operative for rotatably displacing the swash plates of a hydrostatic transmission throughout a full range of movement thereof.

A further object is to provide hydrostatic transmission controls centering mechanism comprising a pair of oppositely facing levers continuously yieldably urged by resilient means toward one another in a scissor-like action so that upon release of an actuating torque applied thereto said levers are operative for returning the associated hydrostatic transmission controls to a neutral position.

A still further object is to provide, in a hydrostatic transmission having cam plate valve porting means for controlling hydraulic servo mechanisms operative for adjustably rotating swash plates of the transmission in opposite directions from a neutral position, improved mechanical means resiliently biased toward a neutral centered position and cooperative with said cam plate for returning the transmission to a neutral position upon release of the actuating torque applied thereto in order to effect the movement of said transmission away from its neutral position.

A more comprehensive object is to provide, in a hydrostatic transmission having cam plate valve porting means for controlling hydraulic servo mechanisms operative for adjustably rotating swash plates of the transmission in opposite directions from a neutral position, a pair of levers rotatably mounted coaxially with said cam plate and servo mechanisms and yieldably biased toward one another and selectively engageable with said cam plate for returning the plate to a position such that the transmission will be conditioned for neutral operation upon release of the actuating torque causing displacement of the transmission away from a neutral position.

The foregoing and other objects and features of the invention will become apparent as the disclosure is more fully made in the following detailed description of a preferred embodiment of the invention as illustrated in the accompanying sheets of drawings in which:

FIGURE 5 is a vertical sectional view taken generally along the line 5—5 of FIGURE 2.

Figure 1:
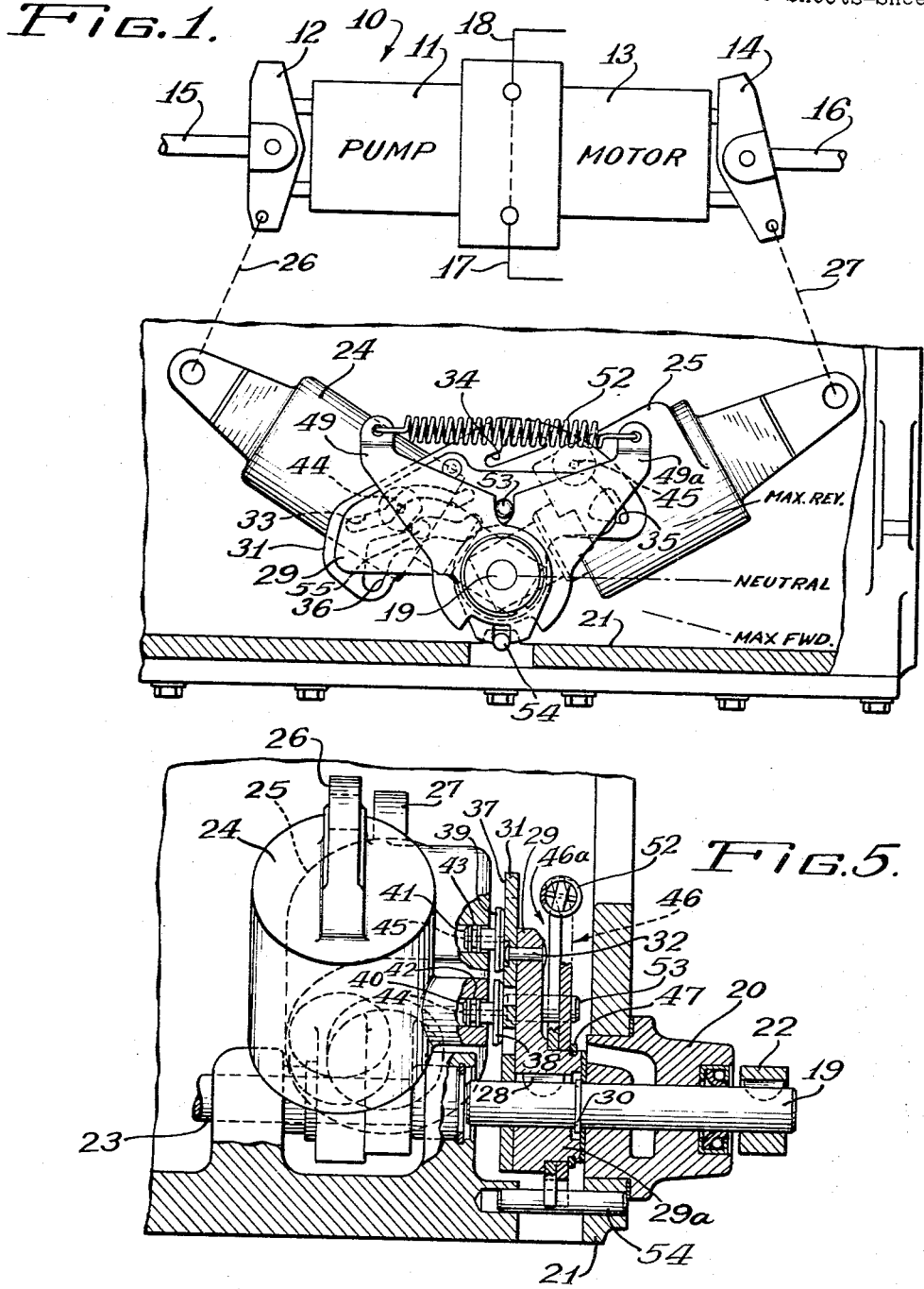
FIGURE 1 is a partially schematic and elevational view showing the present invention adapted to a hydrostatic transmission.

Referring now to FIGURE 1 of the drawings it will be seen that the proposed mechanism is shown, in one preferred application depicted herein, in coupled association with the pump-motor unit of a hydrostatic transmission such as is frequently employed for propulsion of a vehicle. The pump-motor unit, indicated in its entirety by the reference numeral 10, may be generally conventional and as constituted comprises a variable displacement reversible pump 11 having a pivotally mounted swash plate 12 rotatable in opposite directions from a centered neutral position for varying displacement of said pump, and a variable displacement reversible motor 13 having a pivotally mounted swash plate 14 likewise rotatable from a centered position for varying displacement of said motor, all as is well understood. Power input to the pump 11 may be effected through a shaft such as 15 operably connected to suitable power means (not shown), while the output of motor 13 may be operatively coupled by a shaft 16 to the component or device receiving said output, such for instance as the propulsion wheels of a vehicle (not shown). Inlet and outlet fluid conduit connections 17, 18 communicatively connect said unit with a source of fluid pressure such as a conventional hydraulic system (not shown) in accordance with well-known practices. It will be understood suitable mounting and support means will be provided for the pump-motor unit but since the details thereof are not pertinent to the present invention no showing thereof is believed necessary herein.

A shaft 19 (FIGURE 5) is suitably journalled by a bearing 20 carried in a fixed support 21 which may be constituted as a portion of the transmission housing of the vehicle when so employed, and an operating lever 22 mounted on the shaft and constrained for rotation therewith may be connected to suitable actuating means, such as a foot operated pedal or a manually operated handle, neither of which are shown, whereby actuating torque or force may be applied as desired for rotative displacement of said shaft. Coaxially aligned with shaft 19 is a mounting pin or stud shaft 23 suitably mounted on support 21 by means not shown, which is adapted to anchor a pair of hydraulically actuated extendable and contractable servo cylinders 24, 25. The opposite ends of said cylinders are pivotally connected by suitable linkage, such as schematically represented at 86, 27 (FIGURE 1), to the respective pump and motor units 11, 13. Since mechanisms of this character are well known further detailing of the construction thereof is believed unnecessary. The U.S. patent to M. M. Hann et al. No. 3,126,707 shows a similar arrangement of components and means for operating swash plates of a pump-motor unit.

Figure 6:
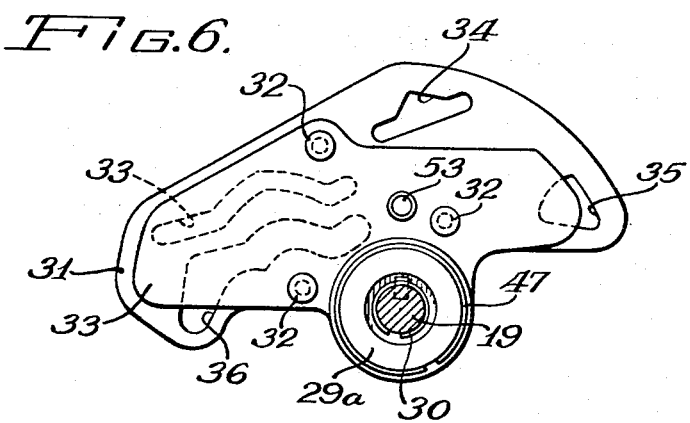
FIGURE 6 is an elevational view of the valve porting cam and back-up plate assembly.

Mounted on shaft 19 (FIGURE 5) and constrained for rotation therewith, by suitable means such as the interlocking key 28, is a hub-like back-up plate member 29, while a snap-ring 30 positioned in an annular recess in shaft 19 may be provided to limit axial displacement of the plate member along said shaft. A flat cam plate 31 having an opening therein and circumscribing shaft 19 is disposed in closely abutting relation with one face of said back-up plate member and may be fixedly secured thereto by suitable fastening means, such as the rivets or the like indicated at 32, and thus is constrained for rotative movement with said hub-like back-up plate member. The cam plate 31 is shaped with an irregular outline, as generally indicated in the drawings, and provided with a plurality of valve porting slots 33, 34 and 35 and a guide pin slot 36 as seen in FIGURE 6. Although illustrated herein as being fabricated of two separate members subsequently secured together it will be appreciated the cam plate and a suitable mounting means could be integrally fashioned without deviating from any of the inventive concepts hereof. An exposed face 37 (FIG. 5) of cam plate 31 is adapted to slidably engage or contact a pair of button-like valve seat members 38, 39 having stem-like portions 40, 41 projecting normally therefrom and adapted to extend into fluid outlet openings 42, 43 in the respective servo cylinders 24, 25. Central longitudinally extending openings 44, 45 in said button members provide ports for communicating with the interiors of the respective cylinders. It will readily be seen, by reference to FIGURES 2, 3 and 4, that the button-like valve seat members 38 and 39 are disposed for cooperative positioning with the respective valve porting slots 33, 34 and 35 in cam plate 31. Thus in various rotated positions of the cam plate the slots therein are effective for covering or uncovering the port openings 44, 45 into the servo cylinders to effect the extension or contraction thereof as desired to control the associated swash plates of the transmission. The cam plate 31 and its cooperative disposition relative to the port openings of the respective servo cylinders will be seen to be generally similar to the cam plate valve porting arrangement disclosed in the aforementioned Hann et al. Patent 3,126,707.

Now in accordance with the more specific teachings of the present invention there is provided a mechanism for centering the cam plate so that the transmission may be returned to and retained in neutral when the displacing actuating control force is removed therefrom. A pair of scissor-like operating levers 46, 46a having central openings therein are rotatably positioned on a hub portion 29a, of back-up plate member 29, and disposed in abutting relation with the latter plate member and retained against axial displacement by suitable means such as the snapping 47 positioned in an annular recess in said hub portion (FIGURE 5).

Figure 2:
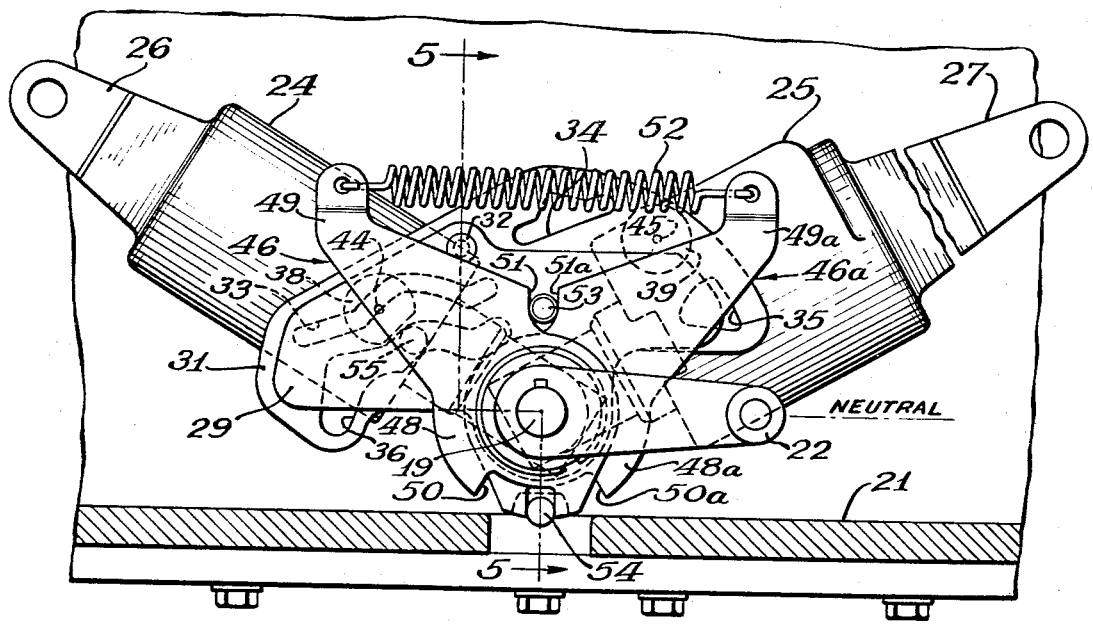
FIGURE 2 is an elevational view of the proposed mechanism and shown in the neutral position thereof.

The operating levers are fashioned with respective body portions 48, 48a and arms 49, 49a and have cut-outs or recesses 50, 50a with oppositely facing and substantially radially extending wall portions, and shoulder abutments 51, 51a provided in the respective body portions thereof. A coil spring such as 52 has the opposite ends thereof bent over and anchored in openings in the respective arms 49, 49a of said levers and said spring is positionably anchored under tension so that the arms of said levers are constantly urged toward one another. A pin or stud 53 fixedly mounted in cam plate 31 and back-up plate member 29 for movement therewith is disposed to extend axially into a space between the shoulder abutments 51, 51a of said levers thereby providing a displaceable stop or abutment member against which said levers are constantly urged by the action of spring 52 when the transmission is conditioned for neutral operation. In this case the cam plate will be positioned as indicated in FIGURE 2 and the relationship of the port openings 44, 45 in the servo cylinders and the respective cam plate slots will be so correlated as to maintain the associated swash plates in positions corresponding to the neutral position of the transmission. It will be seen by further reference to FIGURE 2 that in the neutral position of the transmission the oppositely facing substantially radially extending wall portions of the recesses 50, 50a are in contacting engagement with a pin 54 suitably mounted in the stationary support 21. It will readily be seen also, that rotation of cam plate 31 will always cause a selective corresponding rotation of one of the levers 46, 46a because as the cam rotates in one direction the pin 53 engages one of the shoulder abutments 51, 51a and in the opposite direction engages the other one of said abutments thus always carrying with it one or the other of said levers.

A follower pin 55 mounted for movement with pump servo cylinder 24 extends into the guide slot 36 and thus serves to further correlate movement of these components in a well known manner.

*Operation*

The operation of the pump-motor unit herein is generally conventional with the swash plates of the respective pump and motor elements being rotatable in opposite directions from neutral positions for varying displacement of the respective pump and motor components between minimum and maximum stroke thereof to thereby correspondingly vary the power transmitted therebetween, the relative speeds of the input and output shafts, or the direction of rotation of the output shaft. In a transmission of this type when it is conditioned for neutral operation the outlet port of the servo cylinder operatively connected to the motor component thereof is usually covered over or closed so that the cylinder is extended to produce a maximum stroke condition for said motor, while the outlet port of the servo cylinder operatively connected to the pump component is partially opened or uncovered so as to establish a differential of pressure in the associated servo cylinder sufficient to maintain the connected swash plate at a minimum stroke and in a substantially neutral position. The relative position of the control components in this condition are illustrated in FIGURE 2 where it will be seen that outlet port 45, of motor servo 25 is located between the valving slots 34 and 35 and is covered by a solid portion of cam plate 31, while outlet port 44 of pump servo 24 is disposed in alignment with an edge of cam slot 33 so that only a portion of the latter port is covered. In this neutral position of the transmission the spring 52 is effective for urging the shoulder abutments 51, 51a of levers 46, 46a into abutting relation with the movable pin 53 while opposite generally radially extending wall portions of the recesses 50, 50a of said levers are brought into engagement with the stationary pin 54. It will be understood of course that in this position the operating force for actuating lever 22 has been removed therefrom and since the latter lever is connected to shaft 19 said shaft likewise will be returned to an inactive or neutral position.

Figure 3:
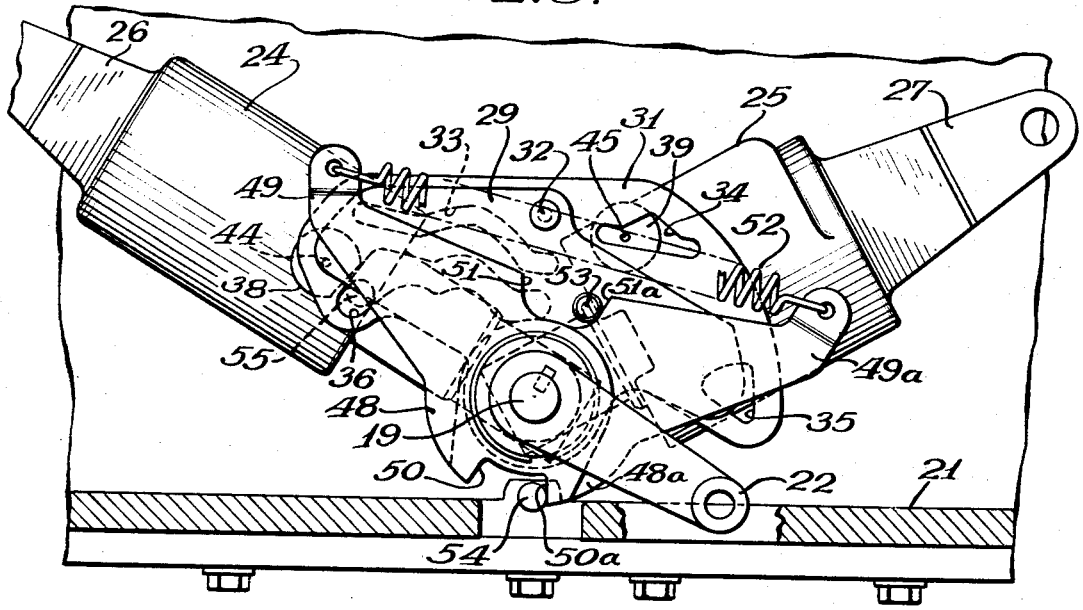
FIGURE 3 is a view generally similar to the preceding view but shown in position corresponding to a maximum forward speed position of the associated hydrostatic transmission.

Now assume it is desired to condition the transmission to produce a forward movement of the associated vehicle whereupon an actuating force is applied to lever 22 to effect a clockwise rotation thereof, as viewed in FIGURES 2 and 3, thereby causing the cam plate assembly including mounting member 29 and slotted plate 31 to correspondingly rotate clockwise. As the cam plate assembly rotates the attached pin 53 picks up and engages shoulder abutment 51a, of lever 46a, to effect the clockwise rotation thereof. As lever 46a rotates the lever 46 is prevented from rotation because of the engagement of a radial wall of recess 50 by the stationary pin 54, and as a consequence the spring 52 is extended or elongated whereupon the effective lever arm thereof is reduced as the longitudinal axis of the elongated spring inclines toward and approaches the axis of rotation of shaft 19. Because of this compensating change the resultant force necessary to be applied by an operator to effect movement of the cam plate assembly remains substantially constant throughout the full arc of travel of the cam plate assembly. It will be recognized of course that this feature provides a much desired advantage in operating mechanisms of this general character and thus appreciably enhances the inventive concepts hereof.

As the cam plate assembly is rotated clockwise to produce a forward movement of the associated vehicle the opening of valve port 44 is gradually covered over by the advancing edge of cam slot 33 as it begins to slope or lead away therefrom. Covering this valve port opening permits a pressure build-up in servo cylinder 24 that causes an expansion or extension of said cylinder, and since swash plate 12, controlling displacement of pump 11, is connected thereto said swash plate is rotated in a clockwise direction to effect a variation in displacement of the pump away from its minimum and toward the maximum stroke thereof. As cylinder 24 extends the valve port opening 44 again approaches the edge of cam 33 and this relationship is further regulated and maintained by the pin 55 following in cam guide slot 36. Since pin 55 is mounted on cylinder 24 it moves therewith but is limited in such movement by the path defined by said cam guide slot. It will be understood the paths defined by slots 33 and 36 are correlated to produce an angular displacement of the associated pump swash plate that is selectively established by the angular displacement of the cam plate. It will be seen also, that as cam plate 31 rotates clockwise the valve port opening 45 eventually becomes aligned with the cam slot 34 thus uncovering the latter opening and permitting discharge or release of fluid from servo cylinder 25. Such release of fluid operates to produce a differential of pressure in the latter cylinder which results in a contraction or collapsing of the associated servo cylinder, and since swash plate 14, controlling displacement of motor 13, is connected thereto said swash plate is also rotated in a clockwise direction to effect a variation in the motor displacement away from the maximum and toward the minimum stroke thereof. When it is desired to return the transmission to neutral the actuating force exerted by the operator on lever 22 is removed whereupon spring 52 reacts to return levers 46, 46a to their initial neutral centered position and in doing so likewise returns the interconnected cam plate assembly to its neutral position, as best illustrated in FIGURE 2.

It will be seen that these operations result in bringing the transmission up to speed by first varying the pump swash plate in one direction from a minimum displacement or stroke to a maximum displacement or stroke and subsequently varying the motor swash plate from a maximum displacement or stroke to a minimum displacement or stroke. Conversely, when the speed is reduced, the motor swash plate is first moved from a minimum stroke toward a maximum stroke after which the pump swash plate is moved from maximum stroke toward a minimum stroke.

Figure 4:
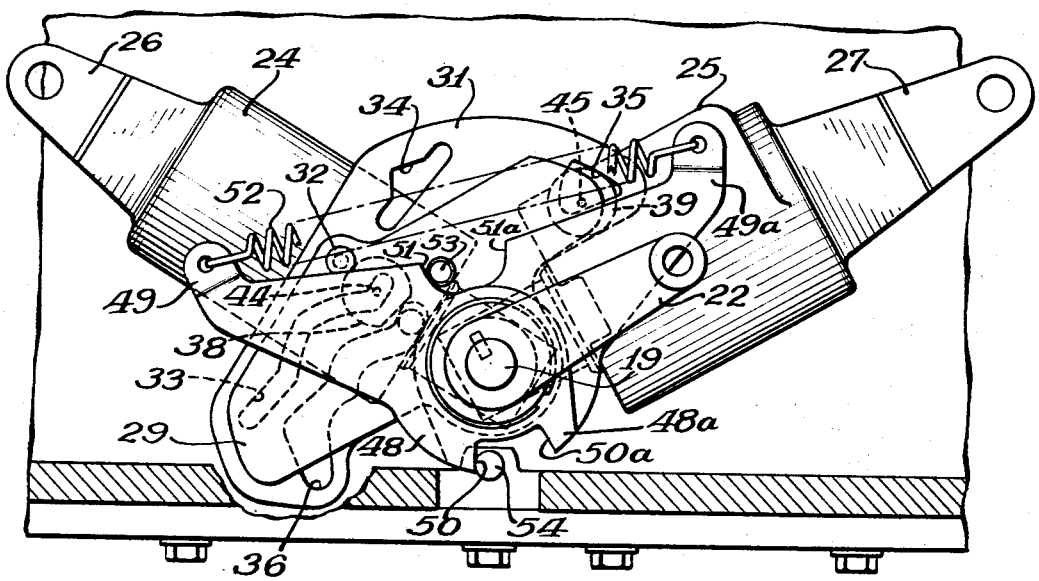
FIGURE 4 is a view similar to FIGURE 3 but shown in position corresponding to a maximum reverse speed position of the transmission.

Assume now it is desired to condition the transmission to produce a reverse movement of the associated vehicle whereupon an actuating force is applied to lever 22 to effect a counterclockwise rotation thereof, as viewed in FIGURES 2 and 4, thereby causing the cam plate assembly to correspondingly rotate counterclockwise from its neutral position. As the said cam plate assembly rotates the attached pin 53 picks up and engages shoulder abutment 51, of lever 46, to initiate a counterclockwise rotation thereof. Upon rotation of lever 46 the lever 46a is prevented from rotation by engagement of a radial wall of recess 50a with the stationery pin 54, whereupon spring 52, as before, is extended and the longitudinal axis thereof inclinded towards the axis of rotation of shaft 19 to provide a compensating change in effective lever arm whereby the resultant actuating force applied by an operator may remain substantially constant throughout the full arc of travel of the cam plate assembly. Upon continuation of this counterclockwise rotation the valve port opening 44 becomes aligned with cam slot 33 and is gradually uncovered thus permitting discharge or release of more fluid from servo cylinder 24. This increased discharge of fluid operates to produce an increased differential of pressure in the latter cylinder which thereupon operates to effect a contraction or collapse of the associated servo cylinder, and since the pump swash plate 12 is connected thereto the latter swash plate is also rotated in a counterclockwise direction to effect a variation in pump displacement away from the minimum and toward the maximum stroke thereof in the latter direction. As cylinder 24 contracts pin 55 therein will of course follow in cam guide slot 36 to maintain the desired relationship therebetween. With the continued counterclockwise rotation of the cam plate assembly the covered valve port opening 45 will eventually become aligned with cam slot 35 thus uncovering the latter port opening and permitting discharge or release of fluid from servo cyinder 25. Such release of fluid serves to produce a pressure differential in the latter cylinder which then operates to effect a contraction of the respective servo cylinder, and since the motor swash plate 14 is connected thereto the latter swash plate will be rotated clockwise to effect a variation in the motor displacement away from the maximum and toward the minimum stroke thereof. When it is desired to return the transmission to neutral from this position the actuating force applied by an operator on lever 22 is removed therefrom and spring 52 thereupon reacts to return levers 46, 46a together with the interconnected cam plate assembly to the neutral position, as represented in FIGURE 2 hereof.

From the above it should now be apparent that a novel constant torque centering device for a hydrostatic transmission control has been shown and described and it is to be understood that changes may be made in the construction without departing from the spirit of the invention or the scope thereof as defined in the appended claims.

What is claimed is:

1. In a reversible hydrostatic transmission, a reversible variable displacement swash plate pump, a reversible variable displacement swash plate motor, cam plate means pivotally movable in opposite directions from a neutral center position and having separate portions thereon for independently controlling displacement of the pump and displacement of the motor on movement in either direction from the neutral center position, actuating means connected to said cam plate means and operable upon application of an external force for pivoting said cam plate means in opposite directions from a neutral center position, lever means pivotally mounted for movement in opposite directions from a neutral center position and engageable by said cam plate means for selective movement in opposite directions therewith, resilient means connected to and reactive upon said lever means for normally urging the latter means toward a neutral center position and operative upon release of the external actuating force for urging said cam plate means to a neutral center position.

2. The structure described in claim 1 and further characterized in that said lever means includes plural members mounted on a common axis and are selectively engageable by said cam plate means so that upon rotation of said cam in one direction one member of said means is engaged for rotation with said cam and upon rotation of the cam in an opposite direction another member of said means is engaged for rotation with said cam.

3. The invention according to claim 2 but further characterized in that said resilient means is connected to and positioned between said plural members and is positioned therebetween under tension so that said members are constantly urged toward one another.

4. The invention according to claim 3 and further characterized in that the plural members of said lever means are arranged in scissor fashion with opposite ends of said resilient means being connected one each to an end of one of said plural members.

5. The invention according to claim 3 but further characterized in that said plural member lever means is mounted for pivotal movement coaxially with said cam plate.

6. The invention according to claim 5 but further characterized in that each of said plural members is fashioned with an edge abutment portion and a peripherally extending recess proximate the end of the member remote from that to which said resilient means is attached, and said cam plate means includes a projection affixed thereto that is disposed for engagement with said edge abutment portions of said members, and further in that a stop mounted on a fixed support is engageable with opposite walls of the peripheral recesses of said members to limit pivotal movement thereof.

7. The invention according to claim 6 but further characterized in that said plural members are arranged so that upon movement of the cam plate means in one direction the projection thereon engages the edge abutment of one of said plural members for movement with said cam while said stop engages a wall of the recess of the other of said plural members to prevent simultaneous pivotal movement of the latter member.

8. The invention according to claim 7 but further characterized in that said resilient means is so arranged that the longitudinal axis thereof is spaced from and disposed transverse to the axis of rotation of said cam plate means and plural members, and further in that upon rotation of either one of said plural members said resilient means is elongated and the longitudinal axis thereof is inclined toward the rotative axis of said plural members whereby the effective lever arm of said means is decreased as the reactive force of said means is increased so that the external force required for displacing said plural members remains substantially constant throughout the full arc of travel of each of said plural members.

9. In a hydraulic transmission, a variable displacement pump, a variable displacement motor, a first expandable and contractable fluid servo device operable for varying the displacement of the pump, a second expandable and contractable fluid servo device operable for varying the displacement of the motor, a valving port associated with each device so that when completely covered the associated servo device is expanded, when completely uncovered the servo device is contracted, and when partially covered the servo device is stabilized, pivoted cam plate means movable upon application of an external force thereupon in opposite directions from a neutral center position and having separate peripheral valving portions associated respectively with said valving ports, each valving portion being slidable relative to the associated valving port on pivotal movement of the cam to independently control pump displacement and motor displacement, a pair of arms arranged in scissor-like fashion and pivotally mounted coaxially with said cam plate means, means carried by said cam plate means engageable upon movement of the cam in opposite directions from the neutral center position thereof with each of said arms for selective movement of a respective arm with said cam, stop means mounted on a fixed support and engageable with said arms for selectively prohibiting movement of one of said arms upon movement of the other one of said arms, coil spring means pivotally connected at opposite ends thereof to the ends of said arms remote from the pivotal mounting thereof, said spring being positioned under tension so that said arms are constantly urged toward one another and whereby upon release of the external force moving said cam plate means said spring is reactive for returning said cam plate means and said arms to the neutral center position thereof.

10. The invention according to claim 9 wherein a lever mounted coaxially with and connected to said cam plate means extends transversely therefrom with the free end of said lever being adapted to receive application of an external actuating force, and wherein the said pair of arms are mounted in circumscribing relation to a hub portion of said cam plate means, and the longitudinal axis of said coil spring means is spaced from and disposed substantially at a right angle to the axis of rotation of said cam plate means and said pair of arms whereby upon pivotal movement of either one of said arms away from the other one of said arms said spring is elongated and the axis of elongation thereof is inclined and displaced toward the rotative axis of said arms with the effective lever arm of said spring means being decreased as the reactive effect of the latter means is increased wherefore the external force applied to the actuating lever for displacing said arms may remain substantially constant throughout the full arc of travel of each of said arms.

References Cited
UNITED STATES PATENTS

| | | |
|---|---|---|
| 3,107,490 | 10/1963 | Cooper et al. |
| 3,126,707 | 3/1964 | Hann et al. |
| 3,157,998 | 11/1964 | Harris. |

EDGAR W. GEOHEGAN, *Primary Examiner.*